US010027669B2

(12) United States Patent
Sapir et al.

(10) Patent No.: US 10,027,669 B2
(45) Date of Patent: Jul. 17, 2018

(54) AUTHORIZATION TO ACCESS A SERVER IN THE CLOUD WITHOUT OBTAINING AN INITIAL SECRET

(71) Applicant: Intuit Inc., Mountain View, CA (US)

(72) Inventors: Boaz Sapir, Tel Aviv (IL); Gleb Keselman, Modiin (IL); Yaron Sheffer, Tel Aviv (IL)

(73) Assignee: Intuit Inc., Mountain View, CA (US)

(*) Notice: Subject to any disclaimer, the term of this patent is extended or adjusted under 35 U.S.C. 154(b) by 64 days.

(21) Appl. No.: 15/334,440

(22) Filed: Oct. 26, 2016

(65) Prior Publication Data

US 2018/0115550 A1 Apr. 26, 2018

(51) Int. Cl.
*H04L 29/06* (2006.01)
*H04L 29/08* (2006.01)
*G06F 21/62* (2013.01)

(52) U.S. Cl.
CPC .......... *H04L 63/10* (2013.01); *G06F 21/6218* (2013.01); *G06F 21/6245* (2013.01); *H04L 63/102* (2013.01); *H04L 63/205* (2013.01); *H04L 67/1097* (2013.01)

(58) Field of Classification Search
CPC ....... H04L 63/10; G06F 21/604; G06F 21/62; G06F 21/6218
See application file for complete search history.

(56) References Cited

U.S. PATENT DOCUMENTS 9,384,362 B2 7/2016 Cabrera et al.
2012/0324225 A1 12/2012 Chambers et al.
2013/0219462 A1 8/2013 Aratsu et al.
2014/0337528 A1* 11/2014 Barton .................... H04L 41/00 709/225
2014/0380048 A1 12/2014 He et al.
2015/0222606 A1* 8/2015 Yan ....................... H04L 9/0847 713/171

OTHER PUBLICATIONS

Thompson; "PAM 2man Authentication Plugin for Unix and Linux;" Cyber Operations, Analysis, and Research at Argonne National Laboratory; [online] Blog post dated Sep. 15, 2015.
Kolbel, C.; "privacyIDEA Authentication System, Release 2.17;" [online], [retrieved Jan. 23, 2017]. Retrieved from the internet <URL:https://media.readthedocs.org/pdf/privacyidea/latest/privacyidea.pdf>.

* cited by examiner

*Primary Examiner* — Dao Q Ho

(74) *Attorney, Agent, or Firm* — Hawley Troxell Ennis & Hawley LLP; Philip McKay

(57) ABSTRACT

A method and system provides access control for sensitive data. An access control system defines a plurality of access policies for gaining access to the sensitive data. Each access policy includes a plurality of rules that indicate whether or not the client machine can gain access to an initial access secret under the policy. When the access control system receives access request data from a client machine requesting access to the access control system under one of the policies, the access control system compares characteristics of the client machine to the rules of the access policy. If the characteristics of the client machine satisfy the rules of the access policy in the access control system provides an initial access secret, such as an application key, to the client machine.

33 Claims, 3 Drawing Sheets

AUTHORIZATION TO ACCESS A SERVER IN THE CLOUD WITHOUT OBTAINING AN INITIAL SECRET

BACKGROUND

Data security is rapidly becoming the most important, and potentially limiting, factor in the field of data processing. While the emergence of portable data, "cloud computing," and other forms of distributed data processing and data sharing have the potential to provide truly revolutionary and paradigm shifting advances in human activity, current methods of providing security for sensitive data introduce inefficiencies into data access control systems.

For example, many data protection services store application secrets and encryption keys. Data protection services can include a server that runs in a cloud environment and exposes a representational state transfer (REST) application programming interface (API) to client programs running on remote machines. Typically, the client machines are themselves virtual machines in the cloud. In order for the client machine to have access to the API, it must possess an authentication credential known as an API key. Because the API key may be needed for accessing the data protection service, the API key is not provided directly from the data protection service to the client program. Typically, API keys are provided manually, for example in an email, from some kind of file handover, or from a data protection service administrator. These methods for providing an API key can be very inconvenient and can reduce the efficiency of both human and computing resources. Additionally, they can introduce security issues with regards to the way the API keys are transferred and stored.

Despite these long standing technical problems with inconvenient and risky API key transfers, such API key transfer methods are still widely used. This is primarily due to the fact that, currently, methods and systems for providing better access controls for storage containers storing sensitive data have proven elusive, inefficient, and often ineffective.

What is needed is a technical solution to the long standing technical problem of providing secure access to sensitive data that is effective and efficient.

SUMMARY

Embodiments of the present disclosure address some of the shortcomings associated with current storage container security schemes by providing methods and systems that provide efficient and secure access control for data management systems. Embodiments of the present disclosure address some of the drawbacks of typical access control schemes by providing an access control system that can provide an initial access secret, such as an access key, directly to a cloud-based client machine based on the characteristics of the client machine. The access control system defines an access policy including a set of rules that define the properties of an authorized client machine. When the access control system receives access request data from a client machine requesting access to the data management system, the access control system retrieves access policy data related to the access policy. The access policy data includes the set of rules that govern access to the access control system under the access policy. The client machine can provide client characteristics data together with the access request data or as a follow-up to the access request data. The access control system then compares the client characteristics data to the access policy data in order to determine whether the client characteristics data satisfies the rules of the access policy. In obtaining and evaluating the client characteristics, the access control system uses mechanisms that are not directly controlled by the client and that therefore can be trusted more than information provided by the client itself. These mechanisms may include the cloud infrastructure that manages the client's runtime environment. If the client characteristics data satisfies the rules of the access policy, then the access control system provides an initial access secret to the client machine. The client machine can then use the initial access secret to gain access to the data management system. In this way, the access control system can provide an initial access secret in an efficient and secure manner to the client machine without the need to resort to a manual handoff of the initial access secret. Instead, the access control system can make a preliminary determination based on the characteristics of the client machine that is requesting access to the access control system and can provide an initial access secret to the client machine directly from a server associated with the access control system if the client characteristics satisfy the access policy rules. Consequently, embodiments of the present disclosure provide a technical solution to the long standing technical problem of providing enhanced security while reducing the inefficiencies associated with manually providing and storing an initial access secret.

In one embodiment, the access control system includes an access policy module. The access policy module administers multiple access policies based on the access policy data. Each access policy can be related to one or more client machines or applications. Each access policy can include its own set of rules governing whether an initial access secret should be provided to the client machine or application.

In one embodiment, each access policy includes a policy identification number. The policy identification number is a public number. The access request data received from a client machine can include a policy identification number indicating the policy under which the client machine requests access. The access policy module accesses policy rules data indicating the policy rules for the policy related to the policy identification number included in the access request data. The access policy module can then check the properties of the client machine versus the policy rules and provide the initial access secret if warranted.

In one embodiment, access policies can be created by users of the access control system having special privileges, such as administrator privileges. The access control system can include an access policy generation module that enables the privileged user to generate new policies, to discard policies, or to revise the rules in policies. The access policy generation module can include a user interface that enables the privileged user to select various rules to be included in each policy.

In one embodiment, the rules data includes data relating to the relationship of the client machine to the cloud platform service provider. The relationship can include whether or not the client machine has a particular role in the cloud platform, whether or not the client machine is associated with a particular private cloud, sub-cloud, subnet, or other network or organization hosted by the cloud platform service provider. The rules can include a subnet identification, a private IP address or address range, a public IP address, address range or address pool, whether the client machine corresponds to an image associated with the cloud platform service provider and the access control system, a group within the cloud platform service provider, etc.

In one embodiment, when the access policy module receives access request data from a client machine, the access policy module uses its own available resources to evaluate the client characteristics data provided by the client machine in order to determine whether the client machine complies with the access policy rules. In one embodiment, the access control systems utilize an API of the cloud platform service provider. If the access control system has the privileges required to inspect the properties of the client machine, it can compare the claimed client characteristics data to data available via the cloud platform service provider API. The data available via the cloud platform service provider API can include the client's relationship or membership within private clouds, sub-clouds, groups, or subnets hosted by the cloud platform service provider. The data available via the cloud platform service provider API can include subnet identifications, private IP addresses, public IP addresses, or other information that can be used to verify that the client characteristics data satisfies the rules of the access policy.

In one embodiment, if the access control system does not have the privileges required to access the cloud platform service provider API to check whether the client characteristics data is valid or not, then the access control system can utilize an asset management service provider to assist in this process. In particular, the access control system can rely on the asset management service provider to collect the necessary information either from the cloud platform service provider, or from the client machines in a particular organization. The access control system accesses the asset management service provider to obtain the properties of the client machine and check them against the access policy.

In one example, the cloud platform service provider includes a cloud platform service provider such as Amazon Web Services (AWS), Microsoft Azure, Rackspace, Joyent, Google Cloud, or other cloud platform service providers. In the example AWS, the policy rules can include an IAM Role name, a virtual private cloud (VPC) ID, a subnet ID, an auto scaling group name, a private IP block, a public IP block, etc. In the example in which the cloud service provider is AWS, the client credential data provided by the client machine can include a signed identity document provided by the AWS platform.

Embodiments of the present disclosure address some of the shortcomings associated with traditional access control systems that do not adequately provide secure and efficient access to initial access secrets. A computing system in accordance with one or more embodiments provides confidence to individuals and organizations by providing enhanced efficiency and convenience in providing initial access secrets. The various embodiments of the disclosure can be implemented to improve the technical fields of user experience, data security, and data processing. Therefore, the various described embodiments of the disclosure and their associated benefits amount to significantly more than an abstract idea. In particular, by efficiently and securely providing initial access secrets to clients based on access policies and the characteristics of client machines, individuals and organizations can save money and time and can better secure and access their sensitive data.

Using the disclosed embodiments of a method and system for providing efficient and secure access control for data management systems, a method and system for providing efficient and secure access control for data management systems more accurately is provided. Therefore, the disclosed embodiments provide a technical solution to the long-standing technical problems of securing sensitive data against unauthorized users.

In addition, the disclosed embodiments of a method and system for providing efficient and secure access control for data management systems are also capable of dynamically adapting to the needs of individuals and organizations that operate file systems with sensitive data. Consequently, the disclosed embodiments of a method and system for providing efficient and secure access control for data management systems also provide a technical solution to the long standing technical problem of static and inflexible data protection schemes.

The result is a much more accurate, adaptable, and robust, method and system for providing efficient and secure access control for data management systems, that serves to bolster confidence in data storage security methods and systems. This, in turn, results in: less human and processor resources being dedicated to defending against security threats because more accurate and efficient security measures can be implemented, i.e., fewer processing and memory storage assets; less memory and storage bandwidth being dedicated to buffering and storing data security systems and processes; and less communication bandwidth being utilized to transmit data security software and information for analysis.

The disclosed method and system for providing efficient and secure access control for data management systems does not encompass, embody, or preclude other forms of innovation in the area of data security. In addition, the disclosed method and system for providing efficient and secure access control for data management systems is not related to any fundamental economic practice, fundamental data processing practice, mental steps, or pen and paper based solutions, and is, in fact, directed to providing solutions to new and existing problems associated with data security systems. Consequently, the disclosed method and system for providing efficient and secure access control for data management systems, does not encompass, and is not merely, an abstract idea or concept.

Figure 1:
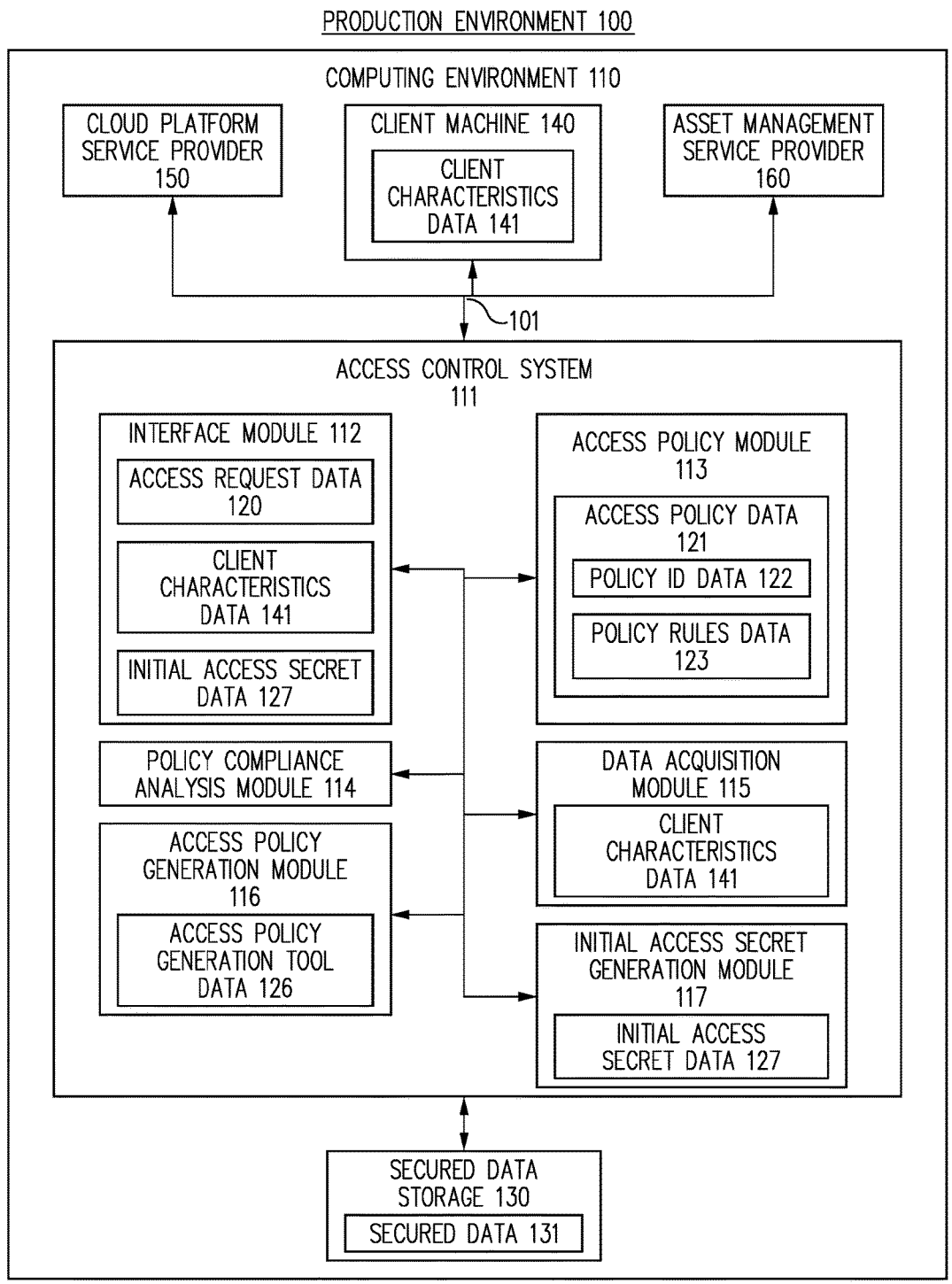
FIG. 1 is a block diagram of software architecture for providing efficient and secure access control for data management systems, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a Virtual Private Cloud (VPC); or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term "storage container" includes, but is not limited to, any physical or virtual data source or storage device. For instance, in various embodiments, a data storage or storage container can be, but is not limited to, one or more of a hard disk drive, a solid state drive, an EEPROM, an optical disk, a server, a memory array, a database, a virtual database, a virtual memory, a virtual data directory, or other physical or virtual data sources.

As used herein, the term "application container" includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

Hardware Architecture

FIG. 1 illustrates a block diagram of a production environment 100 for providing efficient and secure access control for data management systems, according to one embodiment. Embodiments of the present disclosure provide methods and systems for providing efficient and secure access control for data management systems, according to one embodiment. In particular, embodiments of the present disclosure provide an access control system that enables client machines to obtain an initial access secret directly from a server of the access control system enhanced based on the characteristics of the client machine. In particular, the access control system includes one or more access policies that are sets of rules defining the characteristics that the client machine must have in order to be eligible to get an initial access secret directly from the server. By providing efficient and secure access control, the confidence of individuals and organizations in the access control system is increased.

In addition, the disclosed method and system for providing efficient and secure access control for data management systems provides for significant improvements to the technical fields of electronic transaction data security, data processing, data management, and user experience.

In addition, as discussed above, the disclosed method and system for providing efficient and secure access control for data management systems provides for the processing and storing of smaller amounts of data related to security systems, i.e., fewer security systems are needed and less effective security measures can be discarded; thereby eliminating unnecessary data analysis and storage. Consequently, using the disclosed method and system for providing efficient and secure access control for data management systems results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing efficient and secure access control for data management systems.

The production environment 100 includes a computing environment 110. The computing environment 110 includes an access control system 111, a secured data storage 130, a client machine 140, a cloud platform service provider 150, and an asset management service provider 160. The various components of the computing environment 110 are coupled together by one or more physical or virtual communication channels 101, according to one embodiment.

In one embodiment, the access control system 111 controls access to the secured data storage 130. In one embodiment, the access control system 111 controls access to secured data stored within the access control system 111.

The computing environment 110 represents one or more computing systems such as a server, a computing cabinet, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to one embodiment.

In one embodiment, the access control system 111 controls access to sensitive data. To access the sensitive data, the client machine must have an initial access secret, such as an application key. In traditional access control systems, the application key is provided to users, client machines, applications, or programs, via a manual handoff. The manual handoff can include an administrator transferring the file to a user, and email including the application key, storing application key in a physical memory and providing the physical memory to the user, or in other inconvenient ways. Not only are these methods of providing an application key inconvenient, but they present security risks. For instance, gaining access to the physical memory, the email, a piece of paper on which the application key is written, or a computer on which the application key is stored can result in sensitive data being compromised.

The access control system 111 overcomes these drawbacks by enabling the client machine to obtain an initial access secret, such as an application key, directly from an access control system server. The access control system allows the client machine to obtain an initial access secret based on the characteristics of the client machine. The characteristics of the client machine can identify the client machine as a client machine that should have access to the access control system 111. In particular, the access control system 111 defines a plurality of access policies. The access policies include a plurality of rules that determine whether the client machine is able to access the access control system 111. When a client machine transmits access request data to the access control system 111, the client machine includes a policy identification number in the access request data. The policy identification number identifies the policy under which the client machine seeks to gain access to the access control system 111. The access control system 111 refers to the rules in the access policy indicated by the policy identification number. The client machine provides, with the access request data or otherwise, client characteristics data that includes its own identity details and any available evidence that it fulfills the policy. The access control system 111 compares the client characteristics data to the rules in the access policy. The access control system 111 can also obtain client characteristics data from sources external to the access control system 111 and the client machine. If the client characteristics satisfy the rules in the access policy, then the access control system 111 provides an initial access secret to the client machine. Thus, the access control system 111 enables the client machine to get access to secured data that is protected by the access control system server without having to obtain and store an initial access secret. The access control system 111 uses access policies to determine which client machines will be able to access the secured data this way.

In one embodiment, the access control system 111 includes an interface module 112, an access policy module 113, a policy compliance analysis module 114, a data acquisition module 115, an access policy generation module 116, and an initial access secret generation module 117. The access control system 111 utilizes these modules and systems to provide secure and efficient access to sensitive data.

The interface module 112 receives access request data 120 from a client machine 140 requesting the access control system 11 to provide access to the secured date 131. The interface module 112 can also receive client characteristics data 141 from the client machine 140. The client characteristics data 141 can relate to characteristics of the client machine 140. In particular, the client characteristics data 141 can relate to characteristics, credentials, memberships, and associations, with the cloud platform service provider 150. The interface module 112 can receive the client characteristics data 141 together with the access request data 120 from the client machine 140. Additionally, or alternatively, the interface module 112 can receive some or all of the client characteristics data 141 separately from the access request data 121, either from the client machine 140, or from another source.

In one embodiment, the access policy module 113 includes access policy data 121. The access policy data 121 includes a plurality of access policies that define which client machines can access the access control system 111. A client machine that satisfies an access policy will be given an initial access secret that enables the client machine to gain access to the access control system 111.

In one embodiment, the access policy data 121 includes policy ID data 122. The policy ID data 122 includes identification numbers for each of the various access policies defined by the access policy data 121. When the client machine requests access to the secured data 131, the client machine can provide a policy identification number. The access policy module 113 can match the policy identification number to a policy identified in the policy ID data 122 and can determine under which policy the client machine seeks to gain access to the access control system 111.

In one embodiment, the access policy data 121 includes policy rules data 123. The policy rules data 123 indicates, for each access policy identified in the policy ID data 122, one or more rules that define what client machine can gain access to the access control system 111 under that policy. In order to gain access to the access control system 111 under a particular access policy, a client machine must satisfy the rules for that particular policy as set forth in the policy rules data 123.

In one embodiment, the client machine 140 seeks to gain access to the access control system 111 but does not have an initial access secret. The client machine 140 provides access request data 120 to the interface module 112 of the access control system 111. The access request data 120 includes an access policy identification number that identifies an access policy under which the client machine 140 seeks to gain access to the secured data 131. The client machine 140 also provides client characteristics data 141. The client machine 140 can provide the client characteristics data 141 together with the access request data 120 or separately from the access request data 120. The access policy module 113 matches the policy identification number provided in the access request data 120 with a policy identification number stored in the policy ID data 122.

In one embodiment, the access control module uses the policy compliance analysis module 114 to determine if the client machine satisfies the access policy under which the client machine 140 seeks to access the secured data 131. When the access policy module 113 has ascertained the access policy under which the client machine 140 seeks to gain access to the secured data 131, the policy compliance analysis module 114 analyzes the client characteristics data 141 and the policy rules associated with the policy under which the client machine 140 seeks to access the secured data 131. The rules for the selected policy are included in the policy rules data 123. The policy compliance analysis module 114 compares the client characteristics data 141 to the rules in order to determine if the client machine 140 is allowed to gain access under the access policy. If the client characteristics data satisfies the rules for the access policy, then the interface module 112 can provide an initial access secret to the client machine 140. If the client characteristics data 141 does not satisfy the rules for the access policy, then the interface module 112 does not provide an initial access secret to the client machine 140.

In one embodiment, when the client machine 140 has possession of the initial access secret provided by the access control system 111, then the client machine 140 can gain access to the secured data 131 that is guarded by the access control system 111. Additionally, or alternatively, after the client machine 140 presents an initial access secret to the access control system 111, the access control system 111 can still require that the client machine 140 again provide client characteristics data 141 to ensure that the client machine 140 still satisfies the rules included in the policy rules data 123.

In one embodiment, the client characteristics data 141 can include data related to the relationship or credentials that the client machine 140 has with the cloud platform service provider 150. For example, the cloud platform service provider 150 can provide platforms, services, applications, etc. that enable systems, organizations, individuals, etc. to operate in a cloud computing environment. The cloud platform service provider can include roles to which client machines, programs, or applications can belong. The cloud platform service provider can also provide, facilitate, host, or enable private clouds, sub-clouds, subnets, etc. for use by systems, organizations, individuals, etc. Public IP addresses and private IP addresses can be associated with the various roles, groups, private clouds, sub-clouds, subnets, organizations, systems, etc. All of these various services and characteristics associated with the platform service provider 150 can be used as characteristics that identify client machines and their relationships with the cloud platform service provider 150. The client characteristics data 141 can include data identifying these and/or relationships with the public cloud platform service provider 150.

In one embodiment, the access policy rules associated with a particular access policy can include particular relationships or credentials that the client machine has with the public cloud service provider 150. For example, the access policy rules can include that a client machine must be associated with a certain role, a certain sub-cloud, a certain private cloud, a certain subnet, a certain group, a certain public IP address or public IP address block, a certain private IP address or private IP address block, or other features associated with the private cloud platform service provider 150. For each access policy, the policy rules data 123 can include data that indicates specific allowed roles, sub-clouds, private clouds, subnets, groups, public IP addresses or public IP address blocks, private IP addresses or private IP address blocks, or other features associated with the private cloud platform service provider 150.

In one embodiment, the client characteristics data 141 includes data that indicates that the client machine 140 is associated with a particular role, a particular group, a particular sub-cloud, a particular private cloud, a particular subnet, a particular public IP address or private IP address block, a particular private IP address or private IP address block, etc. The client characteristics data 141 can also include other types of data not listed here that identify the characteristics of the client machine 140 and that can be used in ascertaining the characteristics or credentials of the client machine 140 for the purpose of determining whether the client machine 140 satisfies a particular access policy of the access control system 111.

In one embodiment, it is possible that when the interface module 112 receives access request data 120 together with the client characteristics data 141 from the client machine 140, that the access policy compliance analysis module 114 does not have enough data to determine whether or not the client machine 140 satisfies the rules associated with a particular access policy. In this case, the access control system 111 can request additional data related to the client machine 140 directly from the cloud platform service provider 150. For example, the access control system 111 can access an application program interface of the cloud platform service provider 150 in order to request additional data related to the client machine 140. If the access control system 111 has the proper credentials to retrieve such information from the cloud platform service provider 150, the cloud platform service provider 150 can supply the additional data related to the characteristics of the client machine in order to determine whether or not the client machine 140 satisfies the rules of the particular access policy under which the client machine 140 seeks access to the access control system 111. The access control system 111 can then determine, based on the additional client characteristics data provided by the cloud platform service provider 150, whether or not the client machine 140 satisfies the rules of the access policy under which the client machine 140 seeks access to the access control system 111.

In one embodiment, the access control system 111 can access the cloud platform service provider 150 in order to verify the client characteristics data 141 provided by the client machine 140. In this way, the access control system 111 can verify whether or not the client characteristics data 141 provided by the client machine 140 is indeed accurate. If the client characteristics data 141 does not match the data provided by the cloud platform service provider 150, then the access control system 111 can decline to grant an initial access secret to the client machine 140.

In one embodiment, it is possible that the access control system 111 does not have the credentials (or does not have the necessary network access) to directly obtain information from the cloud platform service provider 150 related to the characteristics of the client machine 140. In this case, the access control system 111 can utilize the asset management service provider 160 to assist in obtaining data from the cloud platform service provider 150 related to the characteristics of the client machine 140. The asset management service provider 160 has the necessary credentials for obtaining information from the cloud platform service provider 150. The access control system 111 can direct the asset management service provider 160 to obtain the desired data related to the characteristics of the client machine 140 from the cloud platform service provider 150. Additionally, or alternatively, the asset management service provider 160 can itself retain data related to the relationship of the client machine 140 with the cloud platform service provider 150. In this case, the access control system 111 can request data already in the possession of the asset management service provider 160. The access control system 111 can thus obtain the properties or characteristics of the client machine 140 and check them against the rules of the access policy in order to determine whether or not the client machine 140 satisfies the rules of the access policy under which the client machine 140 seeks access to the secured data 131.

In one embodiment, the access control system 111 includes a data acquisition module 115. The data acquisition module 115 is configured to request and acquire client characteristics data 141 from the client machine 140, a cloud platform service provider 150, and/or the asset management service provider 160. The client characteristics data 141 acquired by the data acquisition module 115 can supply or supplement the client characteristics data used by the policy compliance analysis module 114 in determining if the client machine 140 satisfies the access policy.

In one embodiment, if the client machine 140 does not provide the client characteristics data 141, or if the client characteristics data 141 supplied by the client machine 140 with the client request data 120 is insufficient for satisfying the rules of the access policy under which the client machine requests access, then the data acquisition module 115 can request additional client characteristics data from the client machine 140. The client machine 140 can then supply the additional client characteristics data 141 to the data acquisition module 115 if the client machine 140 has possession of the requested client characteristics data 141.

In one embodiment, if the client machine 140 does not provide adequate client characteristics data 141 for determining if the client machine 140 satisfies the rules of the access policy under which the client machine seeks access to the secured data 131, then the data acquisition module 115 can request additional client characteristics data related to the client machine 140 directly from the cloud platform service provider 150. The data acquisition module 115 can thus obtain the additional client characteristics data 141 directly from the cloud platform service provider 150.

In one embodiment, if the client machine 140 does not provide adequate client characteristics data 141 for determining if the client machine 140 satisfies the rules of the access policy under which the client machine seeks to access the secured data 131 the data acquisition module 115 can request additional client characteristics data related to the client machine 140 from the asset management service provider 160. The asset management service provider 160 can then provide client characteristics data that is already in possession of the asset management service provider 160 to the data acquisition module 115. Additionally, or alternatively, the asset management service provider 160 can request and obtain some or all of the requested client characteristics data from the cloud platform service provider 150. In this way, if the access control system 111 does not have the credentials, or the necessary network connectivity, to obtain client characteristics data directly from the cloud platform service provider 150, then the access control system 111 can still obtain client characteristics data via the asset management service provider 160.

In one example, the cloud platform service provider includes a cloud platform service provider such as Amazon Web Services (AWS), Microsoft Azure, Google Cloud, or other cloud platform service providers.

In the example of AWS, the policy rules can include an IAM Role name, a virtual private cloud (VPC) ID, a subnet ID, an auto scaling group name, a private IP block, a public IP block, etc. In the example of AWS, the client characteristics data provided by the client machine can include a signed identity document provided by the AWS platform.

In one embodiment, the access control system 111 includes an access policy generation module 116. The access policy generation module 116 enables a privileged user, such as an administrator of the access control system 111, to generate new access policies for accessing the access control system 111. The access policy generation module 116 includes access policy generation tool data 126 that helps provide the functionality for generating new access policies. The access policy generation module 116 can include a user interface that enables the privileged user to select rules for a new access policy. The user interface can allow the privileged user to select from a list of possible rules related to one or more characteristics of the client machine associated with the cloud platform service provider 150. The rules can include rules related to roles, groups, private clouds, sub-clouds, subnets, machine images, private or public IP addresses or IP address blocks, or other characteristics or credentials related to a cloud platform service provider. The access policy generation module can allow the privileged user to select a particular cloud platform service provider to which the access policy rules will be related. The access policy generation module 116 can also enable the privileged user to select or create rules related to other characteristics or credentials.

In one embodiment, the access policy generation module 116 enables the privileged user to create a new access policy by first selecting a cloud platform service provider. After the privileged user has selected a particular cloud platform service provider, the access policy generation module 116 will present a selection of possible rules based on the cloud platform service provider selected by the privileged user. In an example in which the privileged user selects AWS as the cloud platform service provider, the access policy generation module 116 provides a list of possible rules that the privileged user can select from. The rules can include one or more of an JAM role, a VPC ID, a subnet ID, an auto scaling group, a private IP block, a public IP block, categories of Amazon machine images, etc.

In one embodiment, the access policy generation module 116 can also enable the privileged user to select the type of application key or initial access secret that will be granted to a client machine approved under the access policy, in order to determine the permissions that the client machine will receive with respect to the secured data 131. For example, the privileged user can choose whether the approved client machine will have read-only access to secured data 131, read and write access to secured data 131, the roles that will be associated with the initial access secret, etc.

In one embodiment, the access policy generation module 116 can also enable the privileged user to select an expiration time period after which the initial access secret will expire. The client machine must use the initial access secret within the selected time period or the client machine will not be able to gain access to the secured data 131 without first satisfying the policy rules again and receiving a new initial access secret. In one embodiment, the access policy generation module 116 enables the privileged user to specify that the client machine must obtain a new initial secret every time the client machine accesses the access control system 111.

In one embodiment, the access control system 111 includes an initial access secret generation module 117 including initial access secret data 127. The initial access secret data 127 can include data related to initial access secrets that have already been issued by the access control system 111. The initial access secret data 127 can include data related to the process of generating a new initial access secret. The initial access secret generation module 117 can generate initial access secret data 127 in accordance with access policy rules selected by the access policy generation module 116.

In one embodiment, the initial access secret is an API key.

In one embodiment, the access control system 111 controls access to a secured data storage 130. The secured data storage 130 stores secured data 131. The secured data 131 can include encryption keys, encrypted data, confidential data, data related to the operation of computing system resources, components, assets, and peripherals. The secured data 131 can include sensitive data whose access is governed by the access control system 111. A client machine 140 that seeks to access secured data 131 stored in the secured data storage 130 must have an initial access secret.

In one embodiment, the access control system 111 manages direct access to the secured data storage 130. The data stored in the secured data storage 130 can include data related to the operation of one or more computing systems or peripheral devices that can be operatively connected to the one or more computing systems. If such data is damaged, deleted, or altered there can be serious ramifications to the functionality of the one or more computing devices or peripheral computing devices. In some cases, the computing systems or devices can become defective or entirely nonfunctional. Furthermore, the secured data storage 130 can include sensitive personal data, confidential business data, or other kinds of sensitive data whose access should be restricted and whose loss would be highly detrimental to individuals or organizations. Thus, any access to the secured data storage 130, whether to read data, erase data, or write data must be carefully managed. The access policy module 111 controls direct access to the secured data storage 130.

In one embodiment, the client machine 140 is a cloud-based client machine such as a virtual machine, a collection of virtual assets, applications, programs, or other cloud-based resources. The cloud-based client machine is based on an image associated with the cloud computing service provider 150.

In one embodiment, the access control system 111 includes one or more servers. The access control system 111 can further include other cloud-based assets. One or more servers of the access control system host the various modules and components of the access control system 111. For example, a server associated with the access control system 111 can host the access policy module 113. The access policy module 113 can receive access request data 120 from the client machine 140, and can provide an initial access secret directly to the client machine 140 based on client characteristics data 141 and the access policy data 121.

In one embodiment, after the access control system 111 has provided the initial secret to the client machine, the client machine then provides to the access control system 111 a second access request data. The second access request data includes the initial access secret data and the client characteristics data. The data access control system 111 can then allow the client to access the secured data based on the initial access secret data and if the client characteristics data in the second access request data satisfies the access policy rules. The client machine can send the initial access secret in a protected manner, such as in a cryptographic hash.

As noted above, the specific illustrative examples discussed above are but illustrative examples of implementations of embodiments of the method or process for providing efficient and secure access control for data management systems. Those of skill in the art will readily recognize that other implementations and embodiments are possible. Therefore, the discussion above should not be construed as a limitation on the claims provided below.

Process

Figure 2:
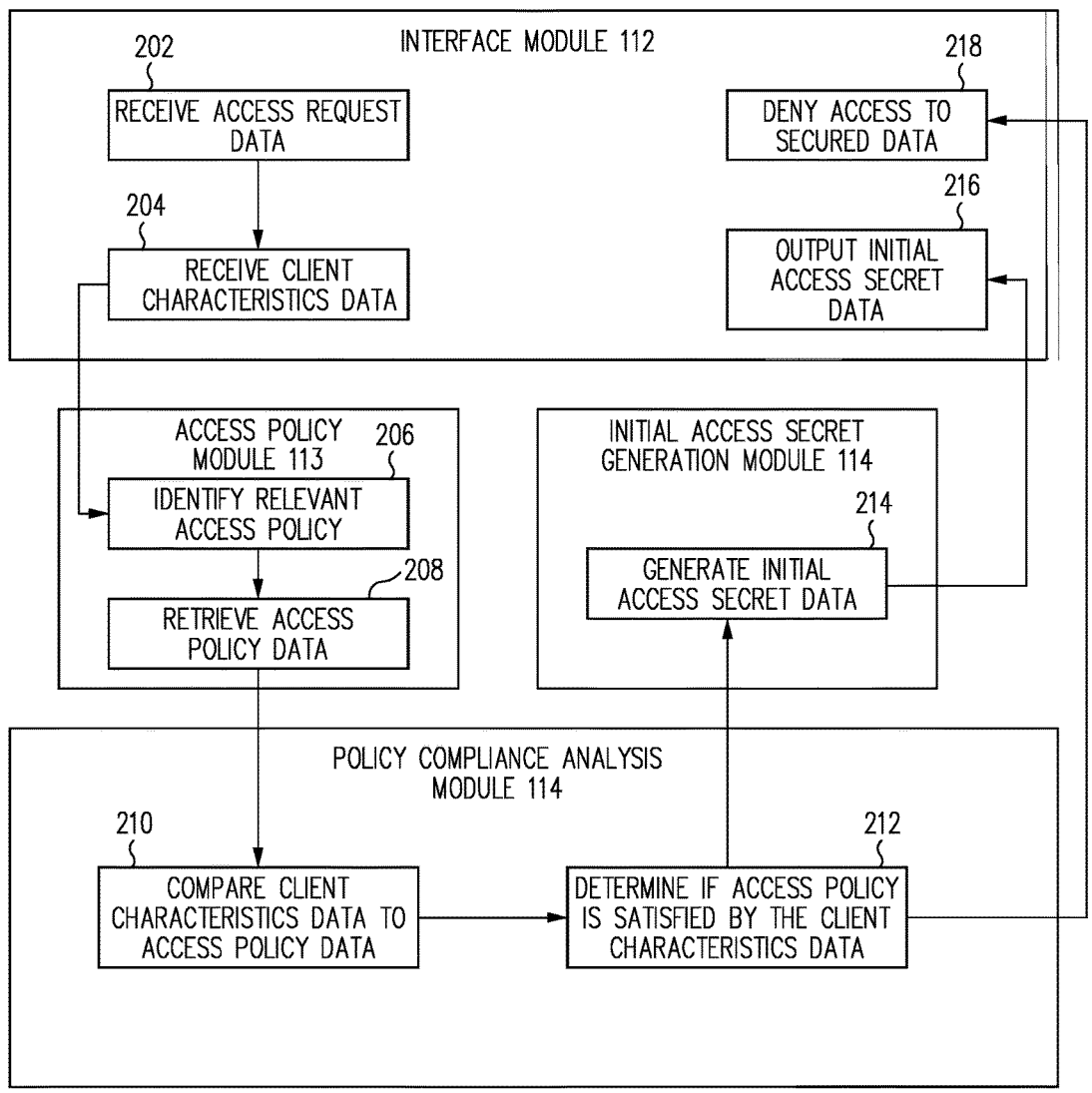
FIG. 2 is a block diagram of a process for providing efficient and secure access control for data management systems, in accordance with one embodiment.

FIG. 2 illustrates a functional flow diagram of a process 200 for providing efficient and secure access control for a data management system, in accordance with one embodiment.

At block 202, the interface module 112 receives access request data from a client machine seeking access to secured data protected by an access control system 111, according to one embodiment. From block 202 the process proceeds to block 204.

At block 204, the interface module 112 receives client characteristics data indicating characteristics of the client machine, according to one embodiment. From block 204 the process proceeds to block 206.

At block 206, the access policy module 113 identifies a relevant access policy based on the access request data, according to one embodiment. From block 206 the process proceeds to block 208.

At block 208, the access policy module 113 receives access policy data related to the relevant access policy and including one or more rules for determining whether the client machine can receive an initial access secret, according to one embodiment. From block 208 the process proceeds to block 210.

At block 210 the policy compliance analysis module 114 compares the client characteristics data to the access policy data, according to one embodiment. From block 210 the process proceeds to block 212.

At block 212, the policy compliance analysis module determines if the access policy is satisfied by the client characteristics data, according to one embodiment. If the access policy is satisfied, then the proceeds from block 212 to block 214.

At block 214, the initial access secret generation module 114 generates initial access secret data including an initial access secret for enabling access to the access control system, according to one embodiment. From block 214 the process proceeds to block 216.

At block 216, the interface module 112 outputs the initial access secret data to the client machine, according to one embodiment.

If the access policy was not satisfied at block 212, then at block 218 the interface module 112 denies the client machine access to the secured data, according to one embodiment. In one embodiment, the interface module 112 can output a rejection notice indicating that access is denied to the secured data or that an initial secret will not be provided to the client machine.

Although a particular sequence is described herein for the execution of the process 200, other sequences can also be implemented in accordance with principles of the present disclosure.

Figure 3:
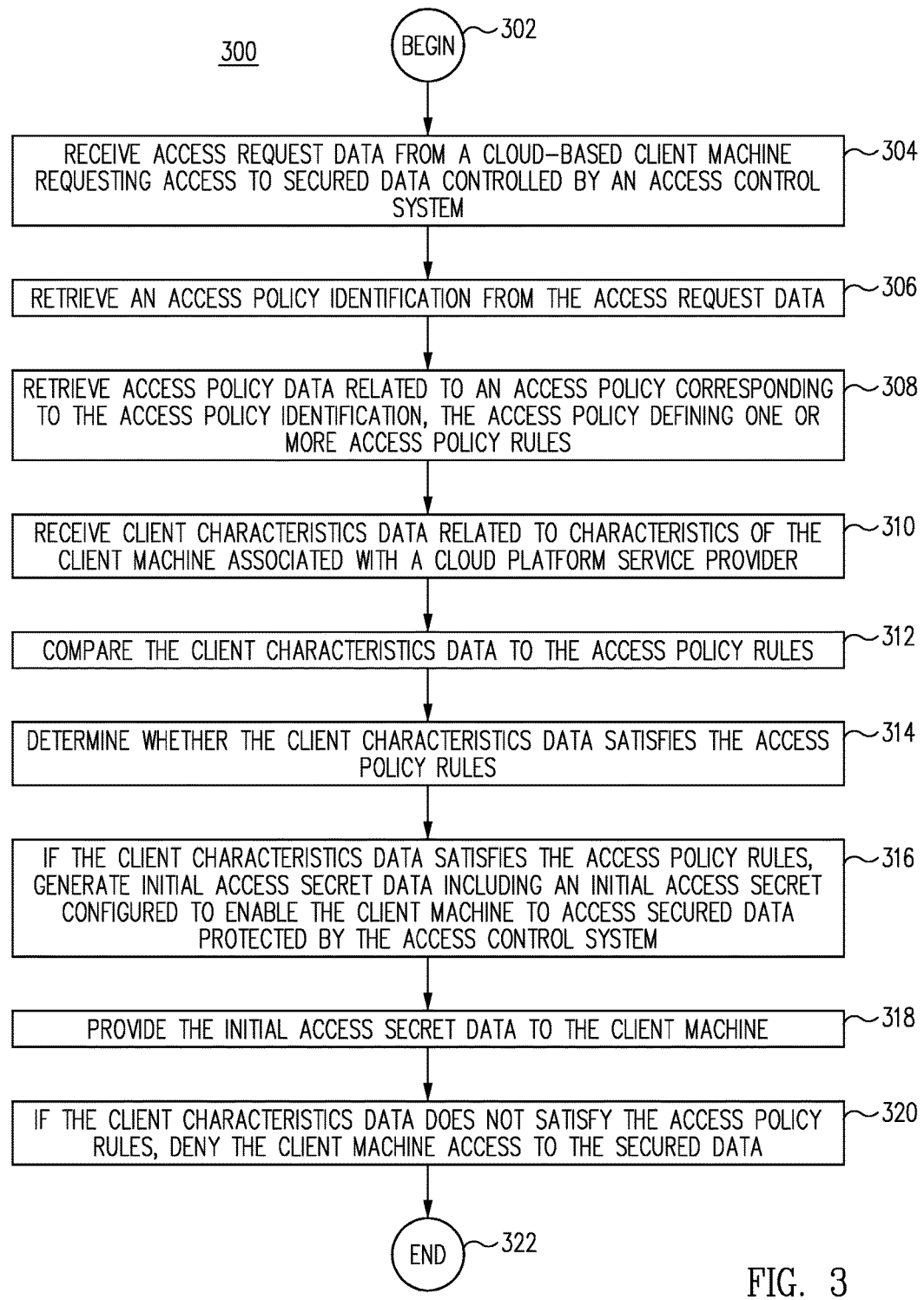
FIG. 3 is a flow diagram of a process for providing efficient and secure access control for data management systems, in accordance with one embodiment.

FIG. 3 illustrates a flow diagram of a process 300 for providing efficient and secure access control for a data management system, according to various embodiments.

In one embodiment, process 300 for providing efficient and secure access control for a data management system begins at BEGIN 302 and process flow proceeds to RECEIVE ACCESS REQUEST DATA FROM A CLOUD-BASED CLIENT MACHINE REQUESTING ACCESS TO SECURED DATA CONTROLLED BY AN ACCESS CONTROL SYSTEM 304.

In one embodiment, at RECEIVE ACCESS REQUEST DATA FROM A CLOUD-BASED CLIENT MACHINE REQUESTING ACCESS TO SECURED DATA CONTROLLED BY AN ACCESS CONTROL SYSTEM 304 process 300 for providing efficient and secure access control for a data management system receives access request data from a cloud-based client machine requesting access to secured data controlled by an access control system.

In one embodiment, once process 300 for providing efficient and secure access control for a data management system receives access request data from a cloud-based client machine requesting access to secured data controlled by an access control system at RECEIVE ACCESS REQUEST DATA FROM A CLOUD-BASED CLIENT MACHINE REQUESTING ACCESS TO SECURED DATA CONTROLLED BY AN ACCESS CONTROL SYSTEM 304 process flow proceeds to RETRIEVE AN ACCESS POLICY IDENTIFICATION FROM THE ACCESS REQUEST DATA 306.

In one embodiment, at RETRIEVE AN ACCESS POLICY IDENTIFICATION FROM THE ACCESS REQUEST DATA 306, process 300 for providing efficient and secure access control for a data management system retrieves an access policy identification from the access request data.

In one embodiment, once process 300 for providing efficient and secure access control for a data management system retrieves an access policy identification from the access request data at RETRIEVE AN ACCESS POLICY IDENTIFICATION FROM THE ACCESS REQUEST DATA 306, process flow proceeds to RETRIEVE ACCESS POLICY DATA RELATED TO AN ACCESS POLICY CORRESPONDING TO THE ACCESS POLICY IDENTIFICATION, THE ACCESS POLICY DEFINING ONE OR MORE ACCESS POLICY RULES 308.

In one embodiment, at RETRIEVE ACCESS POLICY DATA RELATED TO AN ACCESS POLICY CORRESPONDING TO THE ACCESS POLICY IDENTIFICATION, THE ACCESS POLICY DEFINING ONE OR MORE ACCESS POLICY RULES 308, process 300 for providing efficient and secure access control for a data management system retrieves access policy data related to an access policy corresponding to the access policy identification, the access policy defining one or more access rules.

In one embodiment, once process 300 for providing efficient and secure access control for a data management system retrieves access policy data related to an access policy corresponding to the access policy identification, the access policy defining one or more access rules at RETRIEVE ACCESS POLICY DATA RELATED TO AN ACCESS POLICY CORRESPONDING TO THE ACCESS POLICY IDENTIFICATION, THE ACCESS POLICY DEFINING ONE OR MORE ACCESS POLICY RULES 308, process flow proceeds to RECEIVE CLIENT CHARACTERISTICS DATA RELATED TO CHARACTERISTICS OF THE CLIENT MACHINE ASSOCIATED WITH A CLOUD PLATFORM SERVICE PROVIDER 310.

In one embodiment, at RECEIVE CLIENT CHARACTERISTICS DATA RELATED TO CHARACTERISTICS OF THE CLIENT MACHINE ASSOCIATED WITH A CLOUD PLATFORM SERVICE PROVIDER 310 the process 300 receives client characteristics data related to characteristics of the client machine associated with a cloud platform service provider.

In one embodiment, once process 300 receives client characteristics data related to characteristics of the client machine associated with a cloud platform service provider, process flow proceeds to COMPARE THE CLIENT CHARACTERISTICS DATA TO THE ACCESS POLICY RULES 312.

In one embodiment, at COMPARE THE CLIENT CHARACTERISTICS DATA TO THE ACCESS POLICY RULES 312 the process 300 for providing efficient and secure access control for a data management system compares the client characteristics data to the access rules.

In one embodiment, once the process 300 for providing efficient and secure access control for a data management system compares the client characteristics data to the access rules at COMPARE THE CLIENT CHARACTERISTICS DATA TO THE ACCESS POLICY RULES 312, process flow proceeds to DETERMINE WHETHER THE CLIENT CHARACTERISTICS DATA SATISFIES THE ACCESS POLICY RULES 314.

In one embodiment, at DETERMINE WHETHER THE CLIENT CHARACTERISTICS DATA SATISFIES THE ACCESS POLICY RULES 314 the process 300 for providing efficient and secure access control for a data management system determines whether the client characteristics data satisfies the access policy rules.

In one embodiment, once the process 300 for providing efficient and secure access control for a data management system determines whether the client characteristics data satisfies the access policy rules at DETERMINE WHETHER THE CLIENT CHARACTERISTICS DATA SATISFIES THE ACCESS POLICY RULES 314, process flow proceeds to IF THE CLIENT CHARACTERISTICS DATA SATISFIES THE ACCESS POLICY RULES, GENERATE INITIAL ACCESS SECRET DATA INCLUDING AN INITIAL ACCESS SECRET CONFIGURED TO ENABLE THE CLIENT MACHINE TO ACCESS SECURED DATA PROTECTED BY THE ACCESS CONTROL SYSTEM 316.

In one embodiment, at IF THE CLIENT CHARACTERISTICS DATA SATISFIES THE ACCESS POLICY RULES, GENERATE INITIAL ACCESS SECRET DATA INCLUDING AN INITIAL ACCESS SECRET CONFIGURED TO ENABLE THE CLIENT MACHINE TO ACCESS SECURED DATA PROTECTED BY THE ACCESS CONTROL SYSTEM 316 the process 300 for providing efficient and secure access control for a data management system, if the client characteristics data satisfies the access policy rules, generates initial access secret data including an initial access secret configured to enable the client machine to access secured data protected by the access control system.

In one embodiment, once the process 300 for providing efficient and secure access control for a data management system, if the client characteristics data satisfies the access policy rules, generates initial access secret data including an initial access secret configured to enable the client machine to access secured data protected by the access control system at IF THE CLIENT CHARACTERISTICS DATA SATISFIES THE ACCESS POLICY RULES, GENERATE INITIAL ACCESS SECRET DATA INCLUDING AN INITIAL ACCESS SECRET CONFIGURED TO ENABLE THE CLIENT MACHINE TO ACCESS SECURED DATA PROTECTED BY THE ACCESS CONTROL SYSTEM 316, process flow proceeds to PROVIDE THE INITIAL ACCESS SECRET DATA TO THE CLIENT MACHINE 318.

In one embodiment, at PROVIDE THE INITIAL ACCESS SECRET DATA TO THE CLIENT MACHINE 318 the process 300 for providing efficient and secure access control for a data management system provides the initial access secret data to the client machine.

In one embodiment, once the process 300 for providing efficient and secure access control for a data management system provides the initial access secret data to the client machine at PROVIDE THE INITIAL ACCESS SECRET DATA TO THE CLIENT MACHINE 318, process flow proceeds to IF THE CLIENT CHARACTERISTICS DATA DOES NOT SATISFY THE ACCESS POLICY RULES, DENY THE CLIENT MACHINE ACCESS TO THE SECURED DATA 320.

In one embodiment, at IF THE CLIENT CHARACTERISTICS DATA DOES NOT SATISFY THE ACCESS POLICY RULES, DENY THE CLIENT MACHINE ACCESS TO THE SECURED DATA 320 the process 300 for providing efficient and secure access control for a data management system denies the client machine access to the secured data if the client characteristics data does not satisfy the access policy rules.

In one embodiment, once the process 300 for providing efficient and secure access control for a data management system denies the client machine access to the secured data if the client characteristics data does not satisfy the access policy rules at IF THE CLIENT CHARACTERISTICS DATA DOES NOT SATISFY THE ACCESS POLICY RULES, DENY THE CLIENT MACHINE ACCESS TO THE SECURED DATA 320, process flow proceeds to END 322.

In one embodiment, a computing system implemented method provides access control and file encryption for a file system. The method includes receiving access request data from a cloud-based client machine requesting access to secured data controlled by an access control system, retrieving an access policy identification from the access request data, and retrieving access policy data related to an access policy corresponding to the access policy identification. The access policy defines one or more access policy rules. The method further includes receiving client characteristics data related to characteristics of the client machine associated with a cloud platform service provide, comparing the client characteristics data to the access policy rules, determining whether the client characteristics data satisfies the access policy rules, and if the client characteristics data satisfies the access policy rules, generating initial access secret data including an initial access secret configured to enable the client machine to access secured data protected by the access control system. The method also includes providing the initial access secret data to the client machine.

In one embodiment, a non-transitory computer-readable medium has a plurality of computer-executable instructions which, when executed by a processor, perform a method for providing efficient and secure access control for data management systems. The instructions include an access policy module configured to store access policy data related to an access policy for determining whether access should be granted to an access control system. The access policy data includes rules data related to one or more rules. The instructions also include an interface module configured to receive access request data from a cloud-based client machine seeking to access the access control system. The interface module is configured to receive client characteristics data related to the cloud-based client machine. The instructions also include a policy compliance analysis module configured to compare the client characteristics data to the policy rules data to determine if the client machine satisfies the one or more rules. The instructions also include an initial access secret generation module configured to generate initial access secret data including an initial access secret. The interface module is configured to provide the initial access secret data to the client machine if the client characteristics data satisfies the one or more rules.

In one embodiment, a system provides access control and file encryption for a file system. The system includes at least one processor and at least one memory coupled to the at least one processor, the at least one memory having stored therein instructions which, when executed by any set of the one or more processors, performs a process. The process includes receiving, with an interface module of a computing system, access request data from a cloud-based client machine requesting access to secured data controlled by an access control system, retrieving, with an access policy module of a computing system, an access policy identification from the access request data, and retrieving, with the access policy module, access policy data related to an access policy corresponding to the access policy identification. The access policy defining one or more access policy rules. The process also includes receiving, at least in part with the interface module, client characteristics data related to characteristics of the client machine associated with a cloud platform service provider, comparing, with a policy compliance analysis module of a computing system, the client characteristics data to the access policy rules, and determining, with the policy compliance analysis module, whether the client characteristics data satisfies the access policy rules. The process also includes, if the client characteristics data satisfies the access policy rules, generating, with an initial access secret generation module, initial access secret data including an initial access secret configured to enable the client machine to access secured data protected by the access control system, and providing, with the interface module, the initial access secret data to the client machine.

In one embodiment, a computing system implemented method provides efficient and secure access control for a data access control system. The method includes receiving access request data from a cloud-based client machine requesting access to secured data controlled by an access control system, retrieving access policy data related to an access policy defining one or more access policy rules, receiving client characteristics data related to characteristics of the client machine associated with a cloud platform service provider, and comparing the client characteristics data to the access policy rules. The method also includes determining whether the client characteristics data satisfies the access policy rules, if the client characteristics data satisfies the access policy rules, generating initial access secret data including an initial access secret configured to enable the client machine to access the access control system, and providing the initial access secret data to the client machine.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:
1. A method for providing efficient and secure access control for a data management system;
    receiving access request data from a cloud-based client machine requesting access to secured data controlled by an access control system;
    determining an access policy identification from the access request data;

retrieving access policy data representing an access policy corresponding to the access policy identification, the access policy data defining one or more access policy rules;

requesting client characteristics data from an asset management service provider, including requesting that the asset management service provider retrieve the client characteristics data from a cloud platform service provider;

receiving, in response to requesting the client characteristics data from the asset management service provider, the client characteristics data representing characteristics of the client machine;

comparing the client characteristics data to the access policy rules;

determining whether the client characteristics data satisfies the access policy rules;

when the client characteristics data satisfies the access policy rules, generating initial access secret data including an initial access secret configured to enable the client machine to access secured data protected by the access control system, wherein the initial access secret is an application programming interface key; and providing the initial access secret data to the cloud-based client machine; and accessing, by the cloud-based client machine using the initial access secret data, the secured data of the access request data.

2. The method of claim 1, further comprising:
receiving second access request data from the user after providing the initial access secret data to the user, the second access request data including the initial access secret data; and
allowing the client to access the secured data based on the initial access secret data.

3. The method of claim 1, further comprising:
receiving second access request data from the user after providing the initial access secret data to the user, the second access request data including the initial access secret data and the client characteristics data; and
allowing the client to access the secured data based on the initial access secret data and if the client characteristics data in the second access request data satisfies the access policy rules.

4. The method of claim 1, wherein the client characteristics data indicates a relationship of the client machine with the cloud platform service provider.

5. The method of claim 4, wherein the client characteristics data indicates a role of the client machine with the cloud platform service provider.

6. The method of claim 4, wherein the client characteristics data indicates a sub-cloud associated with the client machine.

7. The method of claim 6, wherein the sub-cloud is virtual private cloud.

8. The method of claim 4, wherein the client characteristics data includes a private internet protocol address.

9. The method of claim 4, wherein the client characteristics data includes a public internet protocol address.

10. The method of claim 1, further comprising withholding an initial access secret from the client machine if the client characteristics data does not satisfy the access policy rules.

11. The method of claim 1, wherein receiving the client characteristics data includes receiving at least a portion of the client characteristics data with the access request data.

12. The method of claim 1, wherein receiving the client characteristics data includes receiving at least a portion of the client characteristics data from the cloud platform service provider.

13. The method of claim 1, further comprising receiving the at least a portion of the client characteristics data in response to requesting the client characteristics data from the cloud platform service provider.

14. The method of claim 1, wherein the cloud platform service provider provides a private cloud.

15. The method of claim 1, wherein the cloud platform service provider is a third party cloud platform service provider.

16. A non-transitory computer-readable medium having a plurality of computer-executable instructions which, when executed by a processor, perform a method for providing efficient and secure access control to a data management system, the instructions comprising:

receiving access request data from a cloud-based client machine requesting access to secured data controlled by an access control system;

determining an access policy identification from the access request data;

retrieving access policy data representing an access policy corresponding to the access policy identification, the access policy data defining one or more access policy rules;

requesting client characteristics data from an asset management service provider, including requesting that the asset management service provider retrieve the client characteristics data from a cloud platform service provider;

receiving, in response to requesting the client characteristics data from the asset management service provider, the client characteristics data representing characteristics of the client machine;

comparing the client characteristics data to the access policy rules;

determining whether the client characteristics data satisfies the access policy rules;

when the client characteristics data satisfies the access policy rules, generating initial access secret data including an initial access secret configured to enable the client machine to access secured data protected by the access control system, wherein the initial access secret is an application programming interface key; and providing the initial access secret data to the cloud-based client machine; and accessing, by the cloud-based client machine using the initial access secret data, the secured data of the access request data.

17. The non-transitory computer-readable medium of claim 16, wherein the instructions further include an access policy generation module configured to enable a privileged user of the access control system to modify the access policy and to generate additional access policies.

18. The non-transitory computer-readable medium of claim 16, wherein the instructions further include a data acquisition module configured to supplement the client characteristics data by retrieving additional client characteristics data.

19. The non-transitory computer-readable medium of claim 18, wherein the data acquisition module is configured to retrieve additional client characteristics data from a cloud platform service provider associated with the cloud-based client machine.

20. The non-transitory computer-readable medium of claim 18, wherein the data acquisition module is configured to retrieve additional client characteristics data from an asset management service provider.

21. The non-transitory computer-readable medium of claim 16, wherein the client characteristics data indicates a relationship between the client machine and cloud platform service provider.

22. A system for providing efficient and secure access control for a data management system, the system comprising:
at least one processor; and
at least one memory coupled to the at least one processor, the at least one memory having stored therein instructions which, when executed by any set of the at least one processors, perform a process including:
receiving, with an interface module of a computing system, access request data from a cloud-based client machine requesting access to secured data controlled by an access control system;
determining, with an access policy module of a computing system, an access policy identification from the access request data;
retrieving, with the access policy module, access policy data representing an access policy corresponding to the access policy identification, the access policy data defining one or more access policy rules;
receiving, at least in part with the interface module, from a cloud platform service provider in response to requesting the client characteristics data from the asset management service provider, the client characteristics data representing characteristics of the client machine;
comparing, with a policy compliance analysis module of a computing system, the client characteristics data to the access policy rules;
determining, with the policy compliance analysis module, whether the client characteristics data satisfies the access policy rules;
when the client characteristics data satisfies the access policy rules, generating, with an initial access secret generation module, initial access secret data including an initial access secret configured to enable the client machine to access secured data protected by the access control system, wherein the initial access secret is an application programming interface key;
providing, with the interface module, the initial access secret data to the cloud-based client machine; and
accessing, by the cloud-based client machine using the initial access secret data, the secured data of the access request data.

23. The system of claim 22, wherein the process further includes:
receiving second access request data from the user after providing the initial access secret data to the user, the second access request data including the initial access secret data; and
allowing the client to access the access control system based on the initial access secret data.

24. The system of claim 22, wherein the process further includes:
receiving second access request data from the user after providing the access key data to the user, the second access request data including the initial access secret data and the client characteristics data; and
allowing the client to access the secured data based on the initial access secret data and if the client characteristics data in the second access request data satisfies the access policy rules.

25. The system of claim 22, wherein the client characteristics data indicates a relationship of the client machine with the cloud platform service provider.

26. The system of claim 25, wherein the client characteristics data indicates a role of the client machine with the cloud platform service provider.

27. The system of claim 25, wherein the client characteristics data indicates a sub-cloud associated with the client machine.

28. The system of claim 27, wherein the sub-cloud is virtual private cloud.

29. The system of claim 25, wherein the client characteristics data includes a private internet protocol address.

30. The system of claim 25, wherein the client characteristics data includes a public internet protocol address.

31. The system of claim 22, wherein receiving the client characteristics data includes receiving at least a portion of the client characteristics data with the access request data.

32. The system of claim 22, wherein receiving the client characteristics data includes receiving at least a portion of the client characteristics data from the cloud platform service provider.

33. The system of claim 22, further comprising receiving at least a portion of the client characteristics data in response to requesting the client characteristics data from the cloud platform service provider.

* * * * *